United States Patent
Murata et al.

(10) Patent No.: US 6,353,078 B1
(45) Date of Patent: Mar. 5, 2002

(54) POLYURETHANE ADHESIVE, METHOD FOR USE IN BONDING, AND USE OF MIXTURE

(75) Inventors: Shigeru Murata, Suzuka; Masahiko Yasuda, Yokkaichi; Tetsuya Nakajima, Tsu, all of (JP)

(73) Assignee: Kyowa Yuka Co., Ltd., Tokyo (JP)

( * ) Notice: Subject to any disclaimer, the term of this patent is extended or adjusted under 35 U.S.C. 154(b) by 0 days.

(21) Appl. No.: 09/463,793

(22) PCT Filed: Jul. 23, 1998

(86) PCT No.: PCT/JP98/03285
§ 371 Date: Jan. 27, 2000
§ 102(e) Date: Jan. 27, 2000

(87) PCT Pub. No.: WO99/06498
PCT Pub. Date: Feb. 11, 1999

(30) Foreign Application Priority Data

Jul. 29, 1997 (JP) .............................................. 9-202930

(51) Int. Cl.[7] .............................................. C08G 18/42
(52) U.S. Cl. ........................ 528/83; 525/440; 525/457; 156/307.1; 528/905
(58) Field of Search .................... 528/83, 905; 525/457, 525/440; 156/307.1

(56) References Cited

U.S. PATENT DOCUMENTS

| | | | |
|---|---|---|---|
| 4,704,445 A | 11/1987 | Komiya et al. | 528/49 |
| 5,668,223 A | 9/1997 | Tadokoro et al. | 525/440 |

FOREIGN PATENT DOCUMENTS

| | | |
|---|---|---|
| EP | 0405300 | 1/1991 |
| EP | 0542220 | 5/1993 |
| EP | 0545108 | 6/1993 |
| EP | 0729990 | 9/1996 |
| EP | 0908481 | 4/1999 |
| JP | 3121115 | 5/1991 |
| JP | 481414 | 3/1992 |
| JP | 4103687 | 4/1992 |
| JP | 5247167 | 9/1993 |
| JP | 5262859 | 10/1993 |
| WO | 9609334 | 3/1996 |

Primary Examiner—Rachel Gorr
(74) Attorney, Agent, or Firm—White & Case LLP

(57) ABSTRACT

The present invention provides an adhesive comprising a polyester polyol or polyurethane polyol possessing structural units represented by the following general formula (I) within its molecular structure, and an organic polyisocyanate in which the isocyanate groups may be protected:

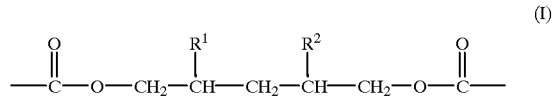

wherein $R^1$ and $R^2$ are the same or different and each represents lower alkyl. The adhesive of the present invention exhibits an excellent initial adhesion strength; and provides adhered objects that exhibit an excellent permanent adhesion strength, hot water resistance, flexibility, flexibility at a low temperature, and fatigue resistance, and is useful in adhering plastic, metal, and the like. In addition, the present invention provides a method of mixing the aforementioned components and using the mixture for adhesion, and a use of the mixture of the aforementioned components.

4 Claims, No Drawings

POLYURETHANE ADHESIVE, METHOD FOR USE IN BONDING, AND USE OF MIXTURE

TECHNICAL FIELD

The present invention relates to a polyurethane adhesive, a method of using it for adhesion, and a use of the mixture; and in particular, the present invention relates to a polyurethane adhesive that is useful in adhering plastics, metals, and the like, a method of using it for adhesion, and a use of the mixture.

BACKGROUND ART

In recent years, multi-layered composite films in which plastic films such as polyethylene, polypropylene, polyamide, polyester, vinyl chloride, vinylidene chloride, or the like, or alternatively, a combination of a plastic film and metallic foil such as aluminium foil are laminated in two-, three-, or four-plus layers, have been developed and used in various ways as a packaging material for food and luxuries.

Furthermore, in order to keep the freshness and flavor of food products and preserve these food products over a long period of time, higher performance, multi-layered composite films are required, and therefore, improvements for an adhesive used in laminating are strongly desired.

In particular, an adhesive for use in multi-layered composite films for packaging retort food products or food products requiring high-temperature sterization, must exhibit superior properties with regard to an initial adhesion strength, permanent adhesion strength, hot water resistance, fatigue resistance, acid resistance, and the like, as well as high-speed lamination.

Hitherto, a polyurethane adhesive has been used for the aforementioned purposes, however, its properties in hot water resistance, heat resistance, and resistance to contents, are inferior. For example, when food containing vinegar is packaged and disinfected with water at a high temperature, the adhesion strength between the aluminium foil and plastics weakens, leading to peeling and loss of function as a multi-layered composite film.

As the aforementioned polyurethane adhesive, Japanese Published Examined Patent Application, No. 25989/92 discloses a polyurethane adhesive comprising a poly(β-methyl-δ-valerolactone)polyol and the like, and an organic polyisocyanate.

Additionally, Japanese Published Unexamined Patent Application, No. 6075/88 discloses a polyurethane adhesive comprising a polymer polyol derived from 3-methyl-1,5-pentanediol, and an organic polyisocyanate.

In addition, Japanese Published Unexamined Patent Application, No. 182387/88 discloses a polyurethane adhesive comprising a polymer polyol derived from 2-methyl-1,8-octanediol, and an organic diisocyanate.

Additionally, Japanese Published Unexamined Patent Application, No. 262859/93 discloses an adhesive comprising a polyester polyol derived from a diol possessing an alkyl side chain, and a hardening agent; and Japanese Published Unexamined Patent Application, No. 81414/92 discloses an adhesive comprising a polyester polyol polyurethane derived from a diol possessing an alkyl side chain. However, the aforementioned publications neither disclose concrete technological details nor disclose any specific disclosure with regard to a polyurethane derived from a 2,4-dialkyl-1,5-penetanediol.

In addition, WO96/09334 discloses a polyurethane comprising a polyester polyol derived from a 2,4-dialkyl-1,5-pentanediol, and an organic polyisocyanate; however, this document does not disclose its use as an adhesive.

It is an object of the present invention to provide a polyurethane adhesive that is particularly useful in manufacturing multi-layered composite films which are formed by means of laminating various plastic films, metallic foil, and the like.

DISCLOSURE OF THE INVENTION

The present invention provides an adhesive comprising a polyester polyol or polyurethane polyol possessing structural units represented by the following general formula (I) within its molecular structure, and an organic polyisocyanate in which the isocyanate groups may be protected (hereinafter, said organic polyisocyanate in which the isocyanate groups are unprotected is sometimes referred to simply as an organic polyisocyanate):

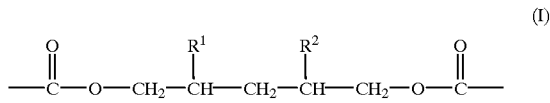

wherein $R^1$ and $R^2$ are the same or different and each represents lower alkyl.

Additionally, the present invention provides a method of mixing a polyester polyol or polyurethane polyol, possessing the structural units represented by the aforementioned general formula (I), and an organic polyisocyanate in which the isocyanate groups may be protected, and using the mixture for adhesion. Furthermore, the present invention provides a use of a mixture of a polyester polyol or polyurethane polyol, possessing the structural units represented by the aforementioned general formula (I), and an organic polyisocyanate in which the isocyanate groups may be protected.

BEST MODES FOR CARRYING OUT THE INVENTION

In the definition of the aforementioned general formula (I), the lower alkyl means a linear or branched chain alkyl having 1 to 8 carbon atoms, examples of which may include methyl, ethyl, propyl, isopropyl, butyl, isobutyl, sec-butyl, tert-butyl, pentyl, isoamyl, neopentyl, 2-pentyl, 3-pentyl, hexyl, heptyl, octyl, and the like.

The polyester polyol, a component of the adhesive of the present invention, is a polyester possessing the structural units represented by the aforementioned general formula (I) as repeating units in the main chain. Preferably, both terminal groups of said polyester are normally hydroxyl groups.

The structural units represented by the aforementioned general formula (I) are formed by esterification of a 2,4-dialkyl-1,5-pentanediol and a dicarboxylic acid, or transesterification of a 2,4-dialkyl-1,5-pentanediol and a dicarboxylic acid ester, or the like.

In other words, an example of the method for preparation is a method carrying out esterification of a diol containing a 2,4-dialkyl-1,5-pentanediol, which is a constituent that provides structural units represented by the general formula (I), and a dicarboxylic acid, according to a conventional method. For example, a diol containing a 2,4-dialkyl-1,5-pentanediol and a dicarboxylic acid is heated to 150–250° C. in the presence of a catalyst for esterification, if necessary. The pressure is reduced to 10–15 mmHg at the same temperature when the acid number of the reaction mixture reaches about 15 (KOH mg/g), and the esterification reaction is further continued. When the acid number of the reaction mixture reaches about 0.3 (KOH mg/g), the reaction is stopped and the mixture is cooled, to obtain the desired polyester polyol.

Additionally, the other example of the method for preparing the polyester polyol is a method carrying out transesterification of a diol containing a 2,4-dialkyl-1,5-pentanediol and a lower alkyl ester of dicarboxylic acid such as a methyl ester, an ethyl ester, or the like, according to a conventional method.

In the starting materials for the esterification reaction, when adding an organic polyisocyanate to a polyester polyol for a use as an adhesive, the molar ratio of all dicarboxylic acids or the lower alkyl esters of the dicarboxylic acids to all diols is 0.90–1.20, and preferably 0.95–1.10. Additionally, when preparing the polyester polyol as a starting material of the polyurethane polyol, the molar ratio of all dicarboxylic acids or the lower alkyl esters of the dicarboxylic acids to all diols is 0.1–1.0, and preferably 0.5–1.0, while the preferred terminal groups of the polyester are normally hydroxyl groups.

Specific examples of the 2,4-dialkyl-1,5-pentandiol may include 2,4-dimethyl-1,5-pentanediol, 2-ethyl-4-methyl-1,5-pentanediol, 2-methyl-4-propyl-1,5-pentanediol, 2,4-diethyl-1,5-pentanediol, 2-ethyl-4-propyl-1,5-pentanediol, 2,4-dipropyl-1,5-pentanediol, 2-isopropyl-4-methyl-1,5-petanediol, 2-ethyl-4-isopropyl-1,5-pentanediol, 2,4-diiosopropyl-1,5-pentanediol, 2-isopropyl-4-propyl-1,5-pentanediol, 2,4-dibutyl-1,5-pentanediol, 2,4-dipentyl-1,5-pentanediol, 2,4-dihexyl-1,5-pentanediol, and the like. Among these examples, 2,4-diethyl-1,5-pentanediol is preferably used.

The 2,4-dialkyl-1,5-pentandiol can be prepared according to a known method such as the method disclosed in Japanese Published Unexamined Patent Application, No. 48642/96 or EP807617A.

A portion of the 2,4-dialkyl-1,5-pentanediol used as a starting material of the polyester polyol may be replaced with other diols. Examples of other diols may include ethylene glycol, propylene glycol, diethylene glycol, 1,4-butanediol, 1,5-pentanediol, neopentylglycol, 1,6-hexanediol, 2-butyl-2-ethyl-1,3-propanediol, 3-methyl-1,5-pentanediol, 2-methyl-1,8-octanediol, 1,9-nonanediol, 1,4-bis(β-hydroxyethoxy)benzene, and the like.

In addition, a small amount of alcohols other than the aforementioned diol, such as a monohydric alcohol including methyl alcohol, ethyl alcohol, isopropyl alcohol, or the like, and a polyhydric alcohol including trimethylol propane, glycerin, or the like, may be used together.

When using the other diol or alcohol as stated above, the usage amount of the 2,4-dialkyl-1,5-pentanediol is preferably 30 mol % or more in all amount of alcohol content in the starting materials for the esterification reaction, and more preferably 50 mol % or more.

Examples of the dicarboxylic acid for preparing the polyester polyol may include succinic acid, adipic acid, azelaic acid, maleic acid, fumaric acid, phthalic acid, terephthalic acid, isophthalic acid, naphthalenedicarboxylic acid, and the like, which may be used alone or in combination of two or more.

When adding an organic polyisocyanate to the polyester polyol for a use as an adhesive, the number average molecular weight of the polyester polyol is preferably 10,000–120,000. The polyester polyol having a number average molecular weight in the above range contains a number of the structural units represented by the aforementioned general formula (I).

In addition, when reacting the polyester polyol with an organic diisocyanate to produce a polyurethane polyol, and subsequently adding an organic polyisocyanate to the polyurethane polyol for a use as an adhesive, the number average molecular weight of the polyester polyol is preferably 400–8,000, and more preferably 400–4,000. When the number average molecular weight of the polyester polyol exceeds the aforementioned range, a deterioration is observed in basic properties of an adhesive such as wetting to the adhered component, cohesion of the resin, or the like.

The polyurethane polyol, a component of the adhesive of the present invention, is obtained by urethane formation from a polyester polyol possessing the structural units represented by the aforementioned general formula (I). The terminal groups of the polyurethane polyol are preferably normally hydroxyl groups.

The aforementioned polyurethane polyol can be prepared according to a conventional method for preparing polyurethane. For example, the polyester polyol obtained according to the aforementioned method is, after a chain extender is added, if necessary, heated to 60–100° C. in advance. Subsequently, an organic diisocyanate is added such that the molar ratio of the isocyanate groups of the organic diisocyanate to the total active hydrogens in the polyester polyol and a chain extender becomes 0.90–1.00, and the resultant mixture is heated at 80–180° C. for 10 minutes to 5 hours, to obtain the desired polyurethane polyol. In preparing the polyurethane polyol, a catalyst may be used, if necessary, in order to accelerate the reaction, and examples of the catalyst may include metallic salts of organic acids such as tin octylate, and the like, organic tertiary amine such as triethylene diamine, and the like, and the like. The usage amount of the catalyst is 0.1–3.0% by weight of the total amount of the polyester polyol, the chain extender, and the organic diisocyanate.

Examples of the organic diisocyanate compound for preparing the polyurethane polyol may include 4,4'-diphenylmethane diisocyanate, 2,6-tolylene diisocyanate, 1,6-hexamethylene diisocyanate, isophorone diisocyanate, 4,4'-dicyclohexylmethane diisocyanate, 1,3-xylylene diisocyanate, and the like, which may be used alone or in combinations of two or more. Furthermore, a small amount of polyfunctional polyisocyanates such as a compound in which 3 moles of 2,6-tolylene diisocyanate are added to 1 mol of trimethylol propane, and the like, may be used together.

Chain extenders include a lower-molecular compound possessing at least two active hydrogen atoms which react with the isocyanate groups, and preferably 2–10 active hydrogen atoms. Examples of the chain extender may include ethylene glycol, 1,4-butanediol, 1,5-pentanediol, 1,6-hexanediol, neopentylglycol, 2-butyl-2-ethyl-1,3-propanediol, 1,4-bis(β-hydroxyethoxy)benzene, isophorone diamine, hydrazine, and the like. The usage amount of the chain extender to the amount of the polyester polyol is preferably a molar ratio of 0.1–10, and more preferably a molar ratio of 0.2–2.0.

When preparing the polyurethane polyol, it is possible to carry out the reaction in the presence of a solvent. The solvent may be added at any stage of the reaction. The polyurethane polyol prepared in a solvent may be used as a component of the adhesive without removing the solvent, according to the objective and use.

Preferred examples of the solvent may include acetone, methyl ethyl ketone, methyl n-propyl ketone, methyl isobutyl ketone, methyl acetate, ethyl acetate, butyl acetate, cyclohexanone, tetrahydrofuran, toluene, xylene, dimethylformamide, dimethylsulfoxide, butyl cellosolve, and the like. The polyurethane polyol is preferably soluble in these solvents.

A number average molecular weight of the polyurethane polyol is preferably 2,500–90,000, and more preferably 10,000–90,000.

The adhesive of the present invention can be obtained by mixing adhesive components such as the aforementioned polyester polyol or polyurethane polyol, an organic polyisocyanate in which the isocyanate groups may be protected, and the like. Furthermore, in the adhesive, the molar ratio of the protected or unprotected isocyanate group per 1 mole of the active hydrogen atom contained in the polyester polyol or polyurethane polyol is 1 mole or more.

In addition, a chain extender may be added, if necessary, and the aforementioned chain extenders may be used.

As a component of the adhesive of the present invention, a portion of the polyester polyol or polyurethane polyol may be replaced with a polyester polyol or polyurethane polyol derived from other diols. In this case, examples of the other diol may include the aforementioned, replaceable diols. In addition, the ratio of a 2,4-dialkyl-1,5-pentanediol in all amount of polyester polyols or in all amount of diols of starting materials for the polyurethane polyol is preferably 30 mol % or more, and more preferably 50 mol % or more.

In order to accelerate hardening, a catalyst for hardening may be added to the adhesive of the present invention, if necessary. Examples of the catalyst may include the aforementioned catalysts used in preparing the polyurethane polyol. The usage amount of the catalyst is 0.1–3.0% by weight to the total amount of the polyester polyol or polyurethane polyol, the chain extender, and the organic polyisocyanate.

A solvent may be added to the adhesive of the present invention, if necessary. Examples of the solvent may include the aforementioned solvents. When using a solvent, the solid content should be 20–80% by weight in order to form a uniform adhesive layer on the adhered object, and preferably 30–70% by weight.

As the organic polyisocyanate, a component of the adhesive of the present invention, an organic polyisocyanate conventionally used as a hardening agent for a polyurethane adhesive may be used, and an organic polyisocyanate having 3 or more isocyanate groups may be preferably used. When the organic polyisocyanates are the polyisocyanate having 3 or more isocyanate groups, the hardened material which the adhesive of the present invention provides is a cross-linked one.

Specific examples of the organic polyisocyanate may include diphenylmethane diisocyanate, 1,6-hexamethylene diisocyanate, a polymer of 1,6-hexamethylene diisocyanate, an adduct of 2,4-tolylene diisocyanate and prenzcatechol, tolylene diisocyanate, 1-chlorophenyl diisocyanate, 1,5-naphthylene diisocyanate, thiodipropyl diisocyanate, ethylbenzene-α-2-diisocyanate, a dimer of 2,4-tolylene diisocyanate, 4,4',4"-triphenylmethane triisocyanate, and the like. Preferred examples may include 3 or more functional compounds in which tolylene diisocyanate, xylylene diisocyanate, hexamethylene diisocyanate, or the like, is added to a polyhydric alcohol such as trimethylol propane, glycerin, pentaerythritol, hexanetriol, or the like. Among these compounds, a trifunctional isocyanate compound in which 3 moles of 2,6-tolylene diisocyanate are added to 1 mole of trimethylol propane is more preferably used. The aforementioned organic polyisocyanate is sold and can be purchased on the market. The organic polyisocyanate is used such that the equivalent ratio of all isocyanate groups to all active hydrogens in the polyester polyol or polyurethane polyol and chain extender is preferably 1–20, and more preferably 1–10. If the ratio is less than 1, the adhesive provides unsatisfactory adhesion strength by insufficiency of isocyanate groups. On the other hand, if the ratio is more than 20, the adhesive provides lack of the flexibility of an adhered object by excess of isocyanate groups.

The adhesive of the present invention is used normally as a dual-liquid type adhesive comprising a component containing the polyester polyol or polyurethane polyol, and a component containing the organic polyisocyanate. The component containing the polyester polyol or polyurethane polyol may include the aforementioned solvent, chain extender, catalyst for hardening, or the like, if necessary. In addition, the component containing the organic polyisocyanate may include the solvent, catalyst for hardening, or the like. The temperature for hardening the dual-liquid type adhesive of the present invention is preferably in the range from room temperature to 250° C., and more preferably 30–100° C.

The adhesive of the present invention can be used as a single-liquid type adhesive by using an organic polyisocyanate in which the isocyanate groups are protected. Examples of the organic polyisocyanate in which the isocyanate groups are protected may include prepolymers and blocked polyisocyanates with phenols, alcohols, oximes, or the like. Herein, the blocked polyisocyanate means an organic polyisocyanate in which the isocyanate groups are blocked with a phenolic hydroxyl group, an alcoholic hydroxyl group, or the like. The blocking groups of these blocked polyisocyanates are removed by heating to liberate the isocyanate groups. The liberated isocyanate groups react with hydroxyl groups in the polyester polyol or polyurethane polyol. The temperature for hardening is normally 80–150° C. Furthermore, examples of a blocking agent, which blocks the isocyanate groups, may include phenols such as phenol, m-nitrophenol, p-chlorophenol, cresol, catechol, and the like; alcohols such as methanol, ethanol, ethylene chlorohydrin, and the like; oximes such as methyl ethyl ketoxime, cyclohexanone oxime, and the like; ε-caprolactam, ethyl malonate, ethyl acetone, ethyl acetoacetate, and the like. The blocked polyisocyanates can be obtained on the market, or alternatively, may also be synthesized according to a conventional method. The blocked polyisocyanate may be used according to the aforementioned usage conditions for the organic polyisocyanate.

Furthermore, the prepolymer of the organic polyisocyanate means an organic polyisocyanate in which terminal isocyanate groups are blocked by the polyester polyol, the polyurethane polyol, a multifunctional active hydrogen compound, or the like. Herein, examples of the multifunctional active hydrogen compounds may include compounds similar to the aforementioned chain extender. The adhesive containing the above prepolymer hardens at room temperature by the water content in the air. The aforementioned prepolymer can be synthesized according to a conventional method. The prepolymer can be used according to the aforementioned usage conditions for the organic polyisocyanate.

When using the adhesive of the present invention, the adhering condition is not particularly limited, however, the usage amount of the adhesive to the adhered object is preferably 0.1–10 g/m$^2$, and more preferably, 1.5–4.5 g/m$^2$.

The adhesive of the present invention is suitable for adhering all kinds of objects, for example, thermoplastic resin such as polyolefine (including polyethylene, polypropylene, and the like), polystyrene, ethylene-vinyl acetate copolymers or saponificated polymers thereof; vinyl chloride resin, polyester (including polyethylene terephthalate, polybutylene terephthalate), polyamide (including nylon), polyurethane, or the like; synthetic resin such as phenol resin, melamine resin, urea resin, or the like; natural rubber; metals such as aluminium, copper, iron, or the like; fibers such as mesh fabric, non-woven fabric, or the like; wood, glass, ceramic, or the like. In particular, the aforementioned adhesive is applicable to a wide variety of uses such as adhering packaging materials for food, pharmaceuticals, or the like, building materials, electrical parts, auto parts, fibers, lamination of plastics, or the like. In addition, the adhesive of the present invention is also suitable as an adhesive for use in laminating polyester film, polyamide film, or the like—metallic foil, such as aluminium foil—polyolefine film; or polyolefine film—polyamide film, or the like, which is used as a packaging material for retort food products that requires disinfection treatment with hot water and preservation for a long time while containing vinegar, vegetable oil, or the like.

In addition, the adhesive of the present invention provides excellent processing properties and an initial adhesion strength, and the adhered object using the adhesive provides an excellent permanent adhesion strength, hot water resistance, flexibility, flexibility at low temperature, fatigue resistance, and the like.

EXAMPLES

In the following, the present invention is further explained using examples and comparative examples. However, the present invention is not limited thereto.

Reference Example 1: Preparation of Polyester Polyol

Transesterification using 641.2 g of 2,4-diethyl-1,5-pentanediol, 194.0 g of terephthalic acid dimethyl ester, and 0.2 g of zinc acetate was carried out at 160–210° C. under a nitrogen stream. After a predetermined amount of methanol was distilled away from the reaction mixture, 83.0 g of isophthalic acid was added and the esterification reaction was continued at 200–220° C. After a predetermined amount of water was distilled away from the reaction mixture, 362.1 g of adipic acid was further added and the mixture was allowed to react at 220–230° C. for 5 hours under a reduced pressure of 1–5 mmHg, to obtain a polyester polyol (polyol A). The polyol A was a polyester glycol which possessed the structural units represented by the aforementioned general formula (I), wherein both of $R^1$ and $R^2$ are ethyl groups, in its main chain, and in which most terminal groups within its molecular structure were hydroxyl groups.

According to analysis of polyol A by gel permeation chromatography (GPC) under the following conditions, a number average molecular weight of polyol A was about 57,000 (according to standard polystyrene calculation method). 100 g of the resultant polyol A was then dissolved in 100 g of ethyl acetate, to prepare a solution with a solid content of 50% by weight (main ingredient A).
(Conditions for GPC analysis)
Column: Two GMHHR-Hs (with inner diameters of 7.8 mm and lengths of 30 cm, manufactured by TOSO CO., LTD.) and a G2000HHR (with an inner diameter of 7.8 mm and length of 30 cm, manufactured by TOSO CO., LTD.) were connected in series.
The temperature of the columns was 40° C.
Moving phase: tetrahydrofuran (flow rate of 1 ml/min)
Detector device: RI (RI-8000, manufactured by TOSO CO., LTD.)

GPC analysis was carried out for the following reference examples under the aforementioned conditions.

Reference Example 2: Preparation of Polyester Polyol

According to a similar method to that in Reference Example 1, 641.2 g of 2,4-diethyl-1,5-pentanediol, 166.0 g of terephthalic acid dimethyl ester, 83.0 g of isophthalic acid, and 431.2 g of azelaic acid were used, to obtain a polyester polyol (polyol B). According to analysis of polyol B by GPC, a number average molecular weight was about 43,000. 100 g of polyol B was dissolved in 100 g of ethyl acetate, to prepare a solution with a solid content of 50% by weight (main ingredient B).

Reference Example 3: Preparation of Polyurethane Polyol

Transesterification of 689.3 g of 2,4-diethyl-1,5-pentanediol, 174.6 g of terephthalic acid dimethyl ester was carried out in the presence of 0.2 g of zinc acetate at 160–210° C. under a nitrogen stream. After a predetermined amount of methanol was distilled away from the reaction mixture, 66.4 g of isophthalic acid was added and the esterification reaction was continued at 200–220° C. After a predetermined amount of water was distilled away from the reaction mixture, 335.8 g of adipic acid was further added, and the esterification reaction was continued for an additional 2 hours at 220–230° C. under a reduced pressure of 1–5 mmHg, to obtain a polyester polyol (polyol C). The polyol C possessed the structural units represented by the aforementioned general formula (I), wherein $R^1$ and $R^2$ each respectively represents an ethyl group, in its main chain.

According to a calculation based on the value of hydroxyl groups, a number average molecular weight of polyol C was about 2,040. Furthermore, 66.6 g of 4,4'-diphenylmethane diisocyanate was added to a mixed solution comprising 204.0 g of polyol C, 17.6 g of neopentyl glycol, 0.3 g of tetraisopropyl titanate, and 127.2 g of ethyl acetate under a nitrogen atmosphere, and the reaction was allowed to proceed at 78° C. for 7 hours, to obtain a polyurethane polyol possessing a number average molecular weight of about 50,000. This polyurethane polyol is a urethane formed from polyol C, and therefore possesses the structural units represented by the aforementioned general formula (I), wherein both of $R^1$ and $R^2$ are ethyl groups.

Subsequently, 169.5 g of ethyl acetate was further added to this reaction mixture, to prepare a solution with a solid content of 50% by weight (main ingredient C).

Reference Example 4: Preparation of Polyurethane Polyol

According to a similar method to that in Reference Example 3, 480.9 g of 2,4-diethyl-1,5-pentanediol, 117.3 g of 1,6-hexane glycol, 174.6 g of terephthalic acid dimethyl ester, and 394.2 g of adipic acid were reacted in the presence of 0.2 g of zinc acetate, to obtain a polyester polyol (polyol D) with a number average molecular weight of 2,100. 4,4'-Diphenylmethane diisocyanate (66.6 g) was then added to a mixed solution comprising 210.0 g of the obtained polyol D, 17.6 g of neopentyl glycol, 0.3 g of tetraisopropyl titanate, and 130.0 g of ethyl acetate under a nitrogen atmosphere. The reaction was carried out at 78° C. for 7 hours, to obtain a polyurethane polyol having a number average molecular weight of about 53,000. Ethyl acetate (172.7 g) was further added to this reaction mixture, to prepare a solution with a solid content of 50% by weight (main ingredient D).

Reference Example 5: Preparation of Polyester Polyol

According to a similar method to that in Reference Example 1, 360.4 g of 1,4-butanediol, 194.0 g of terephthalic acid dimethyl ester, 83.0 g of isophthalic acid, and 357.0 g of adipic acid were reacted in the presence of 0.2 g of zinc acetate, to obtain a polyester polyol (polyol E) having a number average molecular weight of about 58,000. Furthermore, 100 g of polyol E was dissolved in 100 g of ethyl acetate, to prepare a solution with a solid content of 50% by weight (main ingredient E).

Reference Example 6: Preparation of Polyurethane Polyol

According to a similar method to that in Reference Example 3, 499.2 g of 1,4-pentanediol, 194.0 g of terephthalic acid dimethyl ester, 375.0 g of isophthalic acid, and 87.5 g of adipic acid were reacted in the presence of 0.2 g of zinc acetate, to obtain a polyester polyol (polyol F) having a number average molecular weight of 2,120. 4,4'-Diphenylmethane diisocyanate (66.6 g) was then added to a mixed solution comprising 212.0 g of polyol F, 17.6 g of neopentyl glycol, 0.2 g of tetraisopropyl titanate, and 130.6 g of ethyl acetate under a nitrogen atmosphere. The reaction was carried out at 78° C. for 7 hours, to obtain a polyurethane polyol having a number average molecular weight of about 49,000. 174.0 g of ethyl acetate was further added to this reaction mixture, to prepare a solution with a solid content of 50% by weight (main ingredient F).

Examples 1–5, Comparative Examples 1 and 2: Preparation of Adhesive

A hardening agent and a solvent were blended into the main ingredients A–F obtained in the Reference Examples 1–6, to obtain adhesives. The composition of the adhesive is shown in Table 1. Coronate L, (an additive compound in which 2,6-tolylene diisocyanate is added to trimethylol propane at a mol ratio of 3:1, manufactured by Nippon Polyurethane Industry) was used as a hardening agent. In addition, methyl ethyl ketone was added as a solvent for adjusting the viscosity of the solution.

Test Example 1: Manufacturing of Three-layered Composite Film

Using adhesives prepared in Examples 1–5, a three-layered composite film was manufactured according to the following method, and test examples were carried out according to JIS K6854.

First, using a laminator (manufactured by Yasui Seiki Co.), the adhesive was applied to a polyethylene terephthalate film of a thickness of 12 micron (manufactured by TEIJIN LID.) such that the solid content was about 3 g/m². Furthermore, after the solvent in the adhesive was evaporated off, aluminium foil of a thickness of 8 micron was applied onto the film. Subsequently, the adhesive was applied onto the surface of aluminium foil in the similar manner, and after the solvent was evaporated off, a non-drawing polypropylene film with a corona-treated surface of a thickness of 40 micron was attached thereto. The resultant film was kept at 40° C. for three days to harden the adhesive components, thereby yielding a three-layered composite film. All tests except the test for initial adhesion strength were carried out on the three-layered composite film in which the adhesive was hardened.

(Test for initial adhesion strength)

Immediately after manufacturing a three-layered composite film (i.e., before the adhesive was hardened), test pieces of 30 cm×1.5 cm were manufactured, and the adhesion strength between the aluminium foil and drawing polypropylene film was measured by means of a T-type peeling test, using five test pieces and Autograph IS2000 (manufactured by Shimadzu Corp.). The speed of the cross-head was set at 30 cm/minute, and the maximum value, minimum value, and average value of the adhesion strength were recorded. The test results are shown in Table 2.

TABLE 1

The composition of adhesives

| Main ingredient | Example 1 | Example 2 | Example 3 | Example 4 | Example 5 | Comparative Example 1 | Comparative Example 2 |
| --- | --- | --- | --- | --- | --- | --- | --- |
| A | 100 | — | — | — | — | — | — |
| B | — | 100 | — | — | — | — | — |
| C | — | — | 100 | — | 70 | — | — |
| D | — | — | — | 100 | — | — | — |
| E | — | — | — | — | — | 100 | — |
| F | — | — | — | — | 30 | — | 100 |
| Hardening agent | 7 | 7 | 5 | 5 | 5 | 5 | 7 |
| Solvent | — | — | 60 | 60 | 60 | 60 | 60 | cf. 1) Hardening agent: Coronate L (manufactured by Nippon Polyurethane Industry)
cf. 2) Solvent: methyl ethyl ketone
Units of composition are in (g).

TABLE 2

Test results of initial adhesion strength

|  | Example 1 | Example 2 | Example 3 | Example 4 | Example 5 | Comparative Example 1 | Comparative Example 2 |
|---|---|---|---|---|---|---|---|
| Average adhesion strength (kg/1.5 cm) | 0.6 | 0.6 | 1.1 | 0.9 | 0.8 | 0.2 | 0.4 |
| Maximum adhesion strength (kg/1.5 cm) | 0.7 | 0.7 | 1.4 | 1.2 | 1.1 | 0.4 | 0.6 |
| Minimum adhesion strength (kg/1.5 cm) | 0.5 | 0.5 | 0.9 | 0.7 | 0.7 | 0.1 | 0.1 |

The maximum and minimum values of adhesion strength are instant values. The average value of the adhesion strength is not a simple average of the maximum and minimum values, but signifies the average adhesion strength during the total time required for the measuring. The aforementioned are also applicable to the following Tables 3–6.
(Test for adhesion strength)
Test pieces were made of the three-layered composite film in which the adhesive had been hardened, and a T-type peeling test was carried out in a similar manner to that in the test for initial adhesion strength. The test results are shown in Table 3.

(Test for hot water resistance)

A test piece made in the test for adhesion strength was put, along with 700 g of tap water, into an autoclave with a volume of 1,000 ml, and treated at 120° C. for 5 hours. Subsequently, the test piece was cooled, and the piece was visually obserbed and the adhesion strength between the aluminium foil and non-drawing polypropylene film was measured by a T-type peeling test. The measuring method was similar to that used in the test for adhesion strength. The test results are shown in Table 4.

TABLE 3

Test results of adhesion strength

|  | Example 1 | Example 2 | Example 3 | Example 4 | Example 5 | Comparative Example 1 | Comparative Example 2 |
|---|---|---|---|---|---|---|---|
| Average adhesion strength (kg/1.5 cm) | 2.3 | 2.2 | 2.6 | 2.1 | 2.0 | 0.5 | 0.6 |
| Maximum adhesion strength (kg/1.5 cm) | 2.5 | 2.4 | 2.8 | 2.4 | 2.2 | 0.6 | 0.7 |
| Minimum adhesion strength (kg/1.5 cm) | 2.1 | 1.9 | 2.5 | 1.9 | 1.9 | 0.2 | 0.2 |

As shown in Tables 2 and 3, the adhesive of the present invention exhibited excellent performances with regard to the average and minimum adhesion strengths.

TABLE 4

Test results of hot water resistance

|  | Example 1 | Example 2 | Example 3 | Example 4 | Example 5 | Comparative Example 1 | Comparative Example 2 |
|---|---|---|---|---|---|---|---|
| Average adhesion strength (kg/1.5 cm) | 2.2 | 2.2 | 2.6 | 2.0 | 2.0 | 0.4 | 0.5 |
| Maximum adhesion strength | 2.3 | 2.3 | 2.8 | 2.2 | 2.2 | 0.6 | 0.6 |

TABLE 4-continued

Test results of hot water resistance

|  | Example 1 | Example 2 | Example 3 | Example 4 | Example 5 | Comparative Example 1 | Comparative Example 2 |
|---|---|---|---|---|---|---|---|
| (kg/1.5 cm) Minimum adhesion strength (kg/1.5 cm) | 2.0 | 2.0 | 2.6 | 1.9 | 1.8 | 0.1 | 0.2 |
| Visual observation | no change | no change | no change | no change | no change | whitening | no change |

As shown in Table 4, the adhesion strength of the adhesive of the present invention remained stable, even when the object was severely treated with hot water. In addition, no whitening from crystallization was observed. In particular, no decrease in the minimum adhesion strength was observed, and no peeling proceeded at all.

(Test for acid resistance)

A test piece made in the test for adhesion strength was soaked in a 4% aqueous acetic acid solution at 25° C. for 6 weeks, and the adhesion strength was measured in a similar manner to that in the test for adhesion strength. The test results are shown in Table 5.

A test piece used in the test for hot water resistance was divided lengthwise into three equal parts, and a test for flexing fatigue resistance was carried out at 20° C. under the following conditions, using a de-mature flexing fatigue tester (manufactured by Ueshima Seisakusho).

Length of lengthened test piece: 75 mm
Length of flexed test piece: 19 mm
Flex cycle: 5 times/second
Number of flexing: 1000 times Subsequently, the flexed portion was visually observed, and the adhesion strength of the portion was measured. The test results are shown in Table 6.

TABLE 5

Test results of acid resistance

|  | Example 1 | Example 2 | Example 3 | Example 4 | Example 5 | Comparative Example 1 | Comparative Example 2 |
|---|---|---|---|---|---|---|---|
| Average adhesion strength (kg/1.5 cm) | 2.3 | 2.2 | 2.6 | 2.1 | 2.0 | 0.5 | 0.6 |
| Maximum adhesion strength (kg/1.5 cm) | 2.4 | 2.4 | 2.6 | 2.4 | 2.1 | 0.5 | 0.7 |
| Minimum adhesion strength (kg/1.5 cm) | 2.1 | 1.9 | 2.5 | 1.9 | 1.9 | 0.2 | 0.2 |

The adhesive of the present invention exhibited excellent performances with regard to acid resistance, and can be preferably used even with, for example, food products containing vinegar.

(Test for flexing fatigue resistance)

TABLE 6

Test results of flexing fatigue resistance

|  | Example 1 | Example 2 | Example 3 | Example 4 | Example 5 | Comparative Example 1 | Comparative Example 2 |
|---|---|---|---|---|---|---|---|
| Average adhesion strength (kg/1.5 cm) | 2.2 | 2.2 | 2.5 | 2.1 | 2.0 | 0.4 | 0.4 |
| Maximum adhesion strength (kg/1.5 cm) | 2.5 | 2.4 | 2.6 | 2.4 | 2.2 | 0.6 | 0.6 |
| Minimum adhesion | 2.0 | 1.9 | 2.5 | 1.9 | 1.8 | 0.0 | 0.1 |

TABLE 6-continued

Test results of flexing fatigue resistance

| | Example 1 | Example 2 | Example 3 | Example 4 | Example 5 | Comparative Example 1 | Comparative Example 2 |
|---|---|---|---|---|---|---|---|
| strength (kg/1.5 cm) | | | | | | | |

A minimum value of 0.0 for the adhesion strength signifies that crystallization had taken place due to the internal exothermic reaction of the resin due to repeated flexing, and that peeling had occurred in a small portion of the interface of the non-drawing polypropylene film. The three-layered composite film using the adhesive of the present invention exhibited a strong resistance to deformation.

(Test for flexibility)

100 g of each adhesive in Examples 1–5 and Comparative Examples 1 and 2 was uniformly applied to a silicon-treated separating paper. After the solvent was evaporated off, the paper was kept at 40° C. for 3 days and the adhesive was hardened, to prepare a film. After cooling the prepared film, a JIS-3 type test piece was punched from the film. Subsequently, the stress when lengthened by 50% at temperature of 20° C., 0° C., and −20° C., with a cross-head speed of 30 cm/minute (i.e., 50% modulus), was measured using Autograph IS2000 (by Shimadzu Corp.), for comparison of flexibility. The test results are shown in Table 7.

TABLE 7

Flexibility test results

| 50% modulus (kg/1.5 cm) | Example 1 | Example 2 | Example 3 | Example 4 | Example 5 | Comparative Example 1 | Comparative Example 2 |
|---|---|---|---|---|---|---|---|
| 20° C. | 30 | 29 | 26 | 28 | 28 | 37 | 35 |
| 0° C. | 36 | 34 | 30 | 35 | 35 | 48 | 45 |
| −20° C. | 44 | 43 | 36 | 40 | 41 | 72 | 68 |

As shown in Table 7, according to the adhesive of the present invention, flexibility was maintained even at low temperature, and hence, it is possible to provide a multi-layered composite film that is applicable for uses such as frozen food products, specific pharmaceuticals, and the like.

Industrial Applicability

According to the adhesive, method of using it for adhesion, and use of the mixture of the present invention, it is possible to provide an adhered object that exhibits superior performance in properties such as processing, initial adhesion strength, permanent adhesion strength, hot water resistance, acid resistance, flexibility, flexibility at low temperature, fatigue resistance, and the like. Accordingly, the adhesive, method of using it for adhesion, and use of the mixture according to the present invention are useful in adhering plastic, metal, and the like, and particularly useful in manufacturing a multi-layered composite film in which various types of plastic films, metallic foil, or alternatively, a combination of a plastic film and metallic foil are laminated.

What is claimed is:

1. An adhesive comprising a polyester polyol or polyurethane polyol possessing structural units represented by the following general formula (I) within its molecular structure and an organic polyisocyanate in which the isocyanate groups are optionally protected

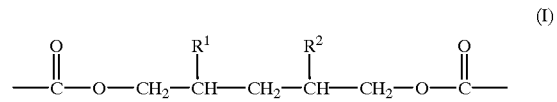

wherein $R^1$ and $R^2$ are the same or different and each represents lower alkyl, and wherein the number average molecular weight of the polyester polyol is 10,000–120,000.

2. A method for making an adhesive, comprising mixing a polyester polyol or polyurethane polyol possessing structural units represented by the following general formula (I) within its molecular structure, and an organic polyisocyanate in which the isocyanate groups are optionally protected

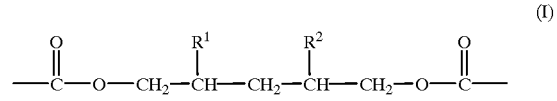

wherein $R^1$ and $R^2$ are the same or different and each represents lower alkyl, and an organic polyisocyanate in which the isocyanate groups are optionally protected; wherein the number average molecular weight of the polyester polyol is 10,000–120,000.

3. A method for adhering at least two objects, comprising:

mixing a polyester polyol or polyurethane polyol possessing structural units represented by the following general formula (I) within its molecular structure, and an organic polyisocyanate in which the isocyanate groups are optionally protected

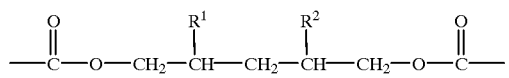
(I)

wherein $R^1$ and $R^2$ are the same or different and each represents lower alkyl, and an organic polyisocyanate to form a mixture, wherein the isocyanate groups of the polyisocyanate are optionally protected;

applying the mixture to a surface of at least one of the objects;

contacting the surface of the object with the mixture with the second object, and allowing the mixture between the objects to dry;

wherein the number average molecular weight of the polyester polyol is 10,000–120,000.

4. The adhesive according to claim 1, wherein the polyester polyol is obtained by esterifying a diol comprising 30 mol % or more of a 2,4-dialkyl-1,5-pentanediol and a dicarboxylic acid.

* * * * *